(12) United States Patent
Kim et al.

(10) Patent No.: US 10,633,829 B2
(45) Date of Patent: Apr. 28, 2020

(54) SPOOL VALVE

(71) Applicants: VOLVO CONSTRUCTION EQUIPMENT AB, Eskilstuna (SE); Jin Wook Kim, Gyeongsangnam-do (KR); Min Heuk Kang, Gyeongsangnam-do (KR)

(72) Inventors: Jin Wook Kim, Gyeongsangnam-do (KR); Min Heuk Kang, Gyeongsangnam-do (KR)

(73) Assignee: Volvo Construction Equipment AB, Eskilstuna (SE)

( * ) Notice: Subject to any disclaimer, the term of this patent is extended or adjusted under 35 U.S.C. 154(b) by 73 days.

(21) Appl. No.: 15/766,673

(22) PCT Filed: Oct. 8, 2015

(86) PCT No.: PCT/KR2015/010634
§ 371 (c)(1),
(2) Date: Apr. 6, 2018

(87) PCT Pub. No.: WO2017/061648
PCT Pub. Date: Apr. 13, 2017

(65) Prior Publication Data
US 2018/0298587 A1 Oct. 18, 2018

(51) Int. Cl.
*E02F 9/22* (2006.01)
*F15B 13/02* (2006.01)
(Continued)

(52) U.S. Cl.
CPC .......... *E02F 9/2267* (2013.01); *E02F 9/2285* (2013.01); *F15B 13/02* (2013.01);
(Continued)

(58) Field of Classification Search
CPC ............... F15B 11/006; F15B 13/0402; F15B 2013/041; F15B 13/0842; F15B 2211/3057
See application file for complete search history.

(56) References Cited

U.S. PATENT DOCUMENTS 3,139,109 A * 6/1964 Ruchser ................ F15B 20/001
137/596.16
RE26,028 E * 5/1966 Tennis ................... F15B 13/042
60/462
(Continued)

FOREIGN PATENT DOCUMENTS

GB      2143304 A    2/1985
JP   H05332312 A   12/1993
(Continued)

OTHER PUBLICATIONS

International Search Report (dated Jun. 23, 2016) for corresponding International App. PCT/KR2015/010634.
(Continued)

*Primary Examiner* — Thomas E Lazo
(74) *Attorney, Agent, or Firm* — Sage Patent Group

(57) ABSTRACT

A spool valve includes a valve block; a first spool, which is mounted onto one side on the inside of the valve block so as to be moved forward and backward in the lengthwise direction and includes a first notch formed on the outer circumferential surface, for controlling the connection between a first pump flow path and a first cylinder flow path through the first notch which is aligned with the first pomp flow path and the first cylinder flow path formed on the inside of the valve block, when moved according to a change in stroke; and a second spool, which is mounted onto the other side on the inside of the valve block so as to be moved forward and backward in the lengthwise direction and includes a second notch formed on the outer circumferential (Continued)

surface, for controlling the connection between a second cylinder flow path and a first tank flow path through the second notch which is aligned with the second cylinder flow path and the first tank flow path formed on the inside of the valve block, when moved according to a change in stroke.

8 Claims, 1 Drawing Sheet

(51) Int. Cl.
*F16K 11/10* (2006.01)
*F16K 11/20* (2006.01)
*F16K 11/22* (2006.01)

(52) U.S. Cl.
CPC ............ *F16K 11/10* (2013.01); *F16K 11/207* (2013.01); *F16K 11/22* (2013.01)

(56) References Cited

U.S. PATENT DOCUMENTS

| | | | | |
|---|---|---|---|---|
| 3,411,536 A * | 11/1968 | Tennis | ................. | F15B 11/006 137/596.15 |
| 3,464,443 A * | 9/1969 | Tennis | ................... | F15B 13/02 137/596.12 |
| 3,951,162 A * | 4/1976 | Wilke | ................... | F15B 11/08 137/106 |
| 4,763,691 A * | 8/1988 | Hahmann | ........... | F15B 13/0402 137/596.14 |
| 6,694,860 B2 * | 2/2004 | Yoshino | ................ | F15B 11/006 60/468 |
| 8,613,292 B2 * | 12/2013 | Miyazoe | ............... | F15B 11/064 137/596.14 |
| 9,903,396 B2 * | 2/2018 | Brinkman | ........... | F15B 13/0832 |
| 2013/0032233 A1 * | 2/2013 | Kim | ...................... | E02F 9/2239 137/625 |
| 2015/0159678 A1 * | 6/2015 | Kim | ...................... | E02F 9/2267 137/596.14 |
| 2016/0362871 A1 * | 12/2016 | Takeuchi | ............... | E02F 9/2267 |

FOREIGN PATENT DOCUMENTS

| | | | |
|---|---|---|---|
| JP | 2006132604 A | 5/2006 | |
| JP | 2015172427 A | 10/2015 | |
| KR | 100432381 B1 | 9/2004 | |
| KR | 20150036001 A | 4/2015 | |
| WO | 2013179969 A1 | 12/2013 | |
| WO | WO-2013179969 A1 * | 12/2013 | .......... F15B 13/0842 |

OTHER PUBLICATIONS

European Official Action (dated Apr. 16, 2019) for corresponding European App. 15905891.6.

* cited by examiner

[Fig. 1]
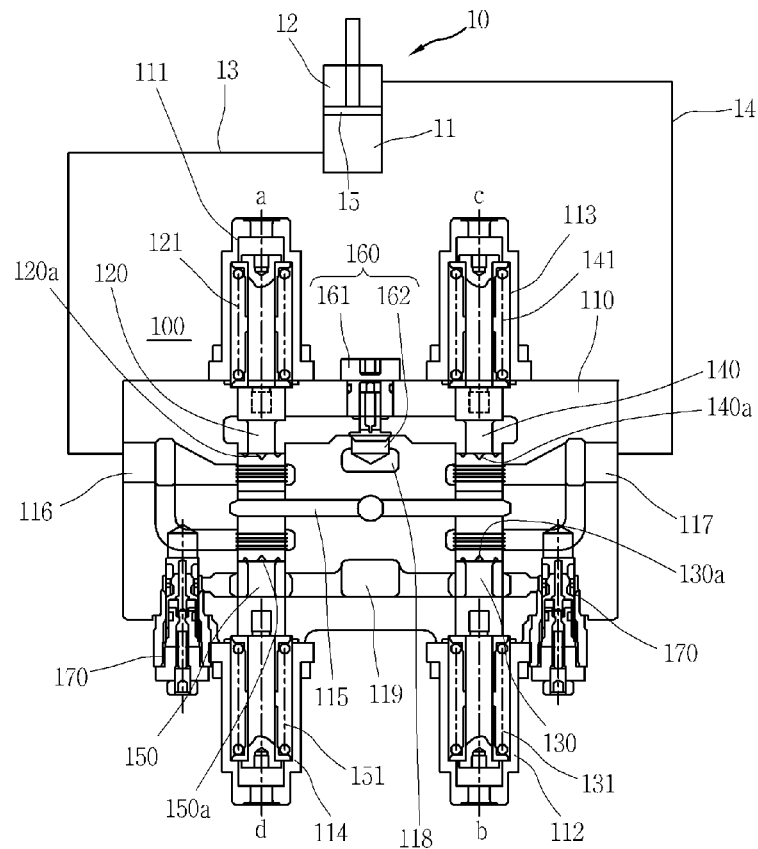
[Fig. 2]
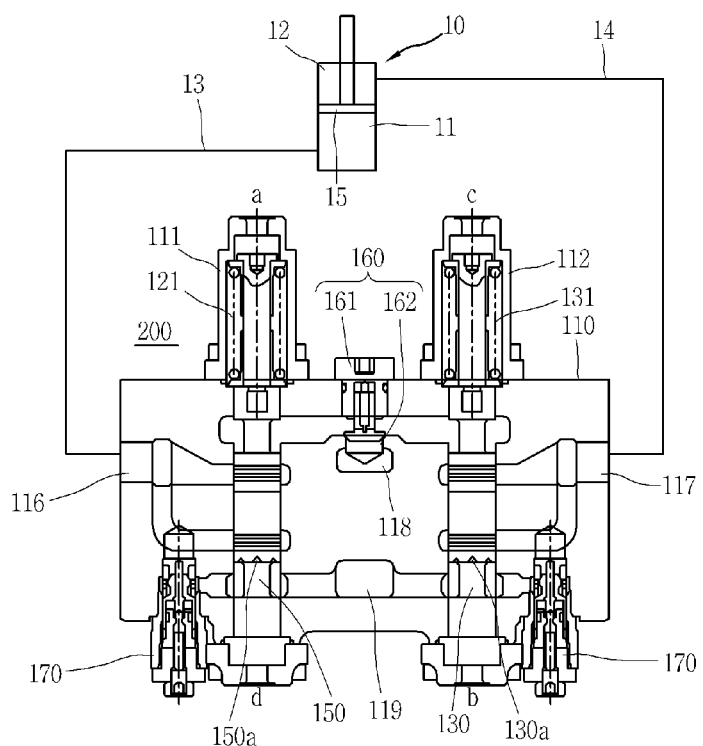

:
SPOOL VALVE

BACKGROUND AND SUMMARY

The present disclosure relates to a spool valve, and more particularly, to a spool valve that can individually control a flow rate and pressure of working fluid passing along a fluid path connecting a pump and a cylinder and a flow rate and pressure of working fluid passing along a fluid path connecting the cylinder and a tank.

A spool valve, i.e. a type of control valve, is commonly used in construction equipment, such as an excavator, and serves to supply working fluid, discharged by a hydraulic pump, to a hydraulic actuator.

In a spool valve of the related art, both a notch connecting pump and cylinder (P-C) paths and a notch connecting cylinder and tank (C-T) paths have been machined in a single spool. The notch connecting the pump-cylinder paths allows working fluid to be supplied to a cylinder by a pump, while the notch connecting the cylinder-tank paths allows working fluid to return to a tank from the cylinder. According to such a configuration, when the spool is moved by a change in the stroke of the spool, depending on pressure applied by a pilot signal, the same area of opening of the path, determined depending on the degree of alignment of the path and the notch, has accordingly been applied to both the pump-cylinder paths and the cylinder-tank paths. Thus, it has been actually impossible for the spool value of the related art to individually control the flow rates and pressures of working fluid passing along the pump-cylinder paths and the cylinder-tank paths in accordance with the operation of the cylinder acting as an actuator and load applied to the cylinder, thereby lowering fuel efficiency, which is problematic.

Accordingly, the present disclosure has been made while keeping the above-described problems occurring in the related art in consideration, and the present disclosure proposes a spool valve that can individually control a flow rate and pressure of working fluid passing along a fluid path connecting a pump and a cylinder and a flow rate and pressure of working fluid passing along a fluid path connecting the cylinder and a tank.

According to an aspect of the present disclosure, a spool valve may include: a valve block; a first spool disposed on one side within the valve block to be reciprocally movable in a longitudinal direction, and having a first notch provided in an outer circumferential surface thereof to be aligned with a first pump path and a first cylinder path, provided within the valve block, wherein the first spool controls a connection between the first pump path and the first cylinder path using the first notch when moving in response to a change in a stroke thereof; and a second spool disposed in the other side within the valve block to be reciprocally movable in a longitudinal direction, and having a second notch provided in an outer circumferential surface thereof to be aligned with a second cylinder path and a first tank path provided within the valve block, wherein the second spool controls a connection between the second cylinder path and the first tank path using the second notch when moving-in-response a change in a stroke thereof.

The spool valve may further include: a first spool cap coupled to the valve block, connected to the first spool, and providing a first port through which a pilot pressure is applied to change the stroke of the first spool; and a second spool cap coupled to the valve block, connected to tire second spool, and providing a second port through which a pilot pressure is applied to change the stroke of the second spool.

The spool valve may further include a third spool disposed within the valve block to face the second spool in a top-bottom direction and to be reciprocally movable in a longitudinal direction, and having a third notch provided in an outer circumferential surface thereof to be aligned with a second pump path and a third cylinder path provided within the valve block. The third spool controls a connection between the second pump path and the third cylinder path using the third notch when moving in response to a change in a stroke thereof.

The spool valve may further include a fourth spool disposed within the valve block to face the first spool in a top-bottom direction and to be reciprocally movable in a longitudinal direction, and having a fourth notch provided in an outer circumferential surface thereof to be aligned with a fourth cylinder path and a second tank path provided within the valve block. The fourth spool controls a connection between the fourth cylinder path and the second tank path using the fourth notch when moving in response to a change in a stroke thereof.

The spool valve may further include: a third spool cap coupled to the valve block, connected to the third spool, and providing a third port through which a pilot pressure is applied to change the stroke of the third spool; and a fourth spool cap coupled to the valve block, connected to the fourth spool, and providing a fourth port through which a pilot pressure is applied to change the stroke of the fourth spool.

The spool valve may further include a drain core provided between the first spool and the fourth spool and between the second spool and the third spoof.

The spool valve may further include a plurality of springs disposed within the first to fourth spool caps, respectively, to elastically support the first to fourth spools connected to the first to fourth spool caps.

The spool valve may further include a first actuator port provided in the valve block to connect the first cylinder path to a first cylinder line connected to a large chamber of the cylinder; and a second actuator port pro vided in the valve block to connect the second cylinder path to a second cylinder line connected to a small chamber of the cylinder.

The spool valve may further include a port relief valve disposed in the valve block to be connected to the first actuator port and the second actuator port.

The valve block may include: a pump core connecting the hydraulic pump to the first pump path to supply working fluid, discharged by the hydraulic pump, to the first pump path; and a tank core connecting the first, tank path to a tank to recover working fluid, returning from the cylinder along the first tank path, to the tank.

The valve block may further include a load check valve disposed between the first pump path and the pump core.

According to the present disclosure, since the spool controlling the connection between the pump path and the cylinder path and the spool controlling the connection between the cylinder path and the tank path are provided independently of each other, different levels of pilot pressure can be applied to the spools to move the spools, depending on the operations and loads of the cylinder acting as an actuator, thereby independently controlling the Sow rates and pressures of working fluid passing along the spools in a spool-specific manner.

In addition, according to the present disclosure, the areas of opening, i.e. the degrees of opening, of the spools controlling the connection between the pump path and the cylinder path and the connection between the cylinder path and the tank path can be adjusted, depending on the operations and loads of the cylinder, so that the operation of supplying working fluid to the cylinder by the pump and the operation of recovering working fluid to the tank from the cylinder can be efficiently controlled. This can consequently prevent excessive increases in the pressures of working fluid passing along the paths while efficiently regulating the flow rates of working fluid passing along the paths, thereby improving fuel efficiency and increasing the operating speed of the actuator.

DESCRIPTION OF DRAWINGS

FIG. 1 is a cross-sectional view illustrating a spool valve according to an exemplary embodiment; and FIG. 2 is a cross-sectional view illustrating a spool valve according to another exemplary embodiment.

DETAILED DESCRIPTION

Hereinafter, a spool valve according to exemplary embodiments will be described in detail with reference to the accompanying drawings.

In the following description, detailed descriptions of known functions and components incorporated in the present disclosure will be omitted in the case hi which the subject matter of the present disclosure is rendered unclear by the inclusion thereof.

As illustrated in FIG. 1, a spool valve 100 according to an exemplary embodiment can be used in a hydraulic apparatus of construction equipment, such as an excavator. However, applications of the spool valve 100 are not limited to construction equipment. The spool valve 100 used in a hydraulic apparatus of construction equipment-controls the How rate and pressure of working fluid from a hydraulic pump, and directs working fluid to a cylinder 10 and recovers working fluid from the cylinder 10. This consequently drives a piston 15 of the cylinder 10 forwards or backwards. Consequently, for example, when the cylinder 10 is a boom cylinder, the cylinder 10 performs boom-up and boom-down operations.

The spool valve 100 according to an exemplary embodiment includes a valve block 110, a first spool 120, a second spool 130, a third spool 140, and a fourth spool 150.

The valve block 110 provides a contour of the spool valve 100. The valve block 110 has defined accommodation spaces therein, in which the first spool 120, the second spool 130, the third spool 140, and the fourth spool 150 are accommodated. Regarding the accommodation space of the valve block 310 in which the first spool 120 is mounted, a first pump path is provided within the valve block 110 to guide working fluid to the accommodation space from the hydraulic pump. A pump core 118 is provided in the valve block 110 to supply working fluid, discharged by the hydraulic pump, to a first pump path. That is, the hydraulic pinup is connected to the first pump path via the pump core 118. In addition, a first cylinder path is provided within the valve block 110 to communicate with an accommodation space for the first spool 120. The first cylinder path provides a path along which working fluid, introduced along the first pump path, is supplied to the cylinder 10. Here, one end of the first cylinder path is connected to a first actuator port 116 provided in the valve block 110. The first actuator port 116 connects the first cylinder path to a first cylinder line 13 connected to a large chamber 11 of the cylinder 10, so that working fluid passing along the first cylinder path is supplied to the cylinder 10.

In addition, regarding the accommodation space of the valve block 110 in which the second spool 130 is disposed, a second cylinder path is connected to the accommodation space. The second cylinder path provides a path along which working fluid returns from the cylinder 10. One end of the second cylinder path is connected to a second actuator port 117 provided in the valve block 110. That is, the second actuator port 117 connects the second cylinder path to a second cylinder line 14 connected to a small chamber 12 of the cylinder 10, so that working fluid discharged from the small chamber 12 of the cylinder 10 passes along the second cylinder line 14 to return or be recovered along the second cylinder path. In addition, a first tank path connected to the tank is provided within the valve block 110 to communicate with the accommodation space for the second spool 130. The first tank path is connected to a tank core 119 provided in the valve block 110. Thus, the tank and the first tank path are connected via the tank core 119.

In addition, regarding the accommodation space of the valve block 110 in which the third spool 140 is disposed, a third cylinder path and a second pump path are provided on one side and the other side of the accommodation space, respectively. The third cylinder path is connected to the smaller chamber 12 of the cylinder 10 via tire second actuator port 117 and the second cylinder line 14. In addition, the second pump path is connected to the hydraulic pump via the pump core 118.

Furthermore, regarding the accommodation space of the valve block 110 in which the fourth spool 150 is disposed, a fourth cylinder path and a second tank path are provided on one side and the other side of the accommodation space, respectively. The fourth cylinder path, is connected to the large chamber 11 of the cylinder 10 via the first actuator port 116 and the first cylinder line 13. Here, the second tank path is connected to the tank via the tank core 119.

Port relief valves 170 are disposed in the valve block 110. The port relief valves 170 are connected to the first actuator port 116 and the second actuator port 117 to adjust the pressure of the cylinder 10 acting as an actuator. A load check valve 160 may be disposed on the valve block to prevent working fluid from flowing backwards. The load check valve 160 may be disposed between the first pump path and the pump core 118 and the second pump path and the pump core 118. The load check valve 160 may include a plug 161 screw-engaged with the valve block 110 and a poppet 162 sliding within the plug 161. Due to this configuration, pressurized working fluid, discharged by the hydraulic pump and located in the pump core 118 lifts the poppet 162 upwards before flowing along the first pump path or the second pump path.

The first spool 120 is disposed on one side within the valve block 110 to be reciprocally movable in the longitudinal direction. The first spool 120 is connected to a first spool cap 111 coupled to the valve block 110. The first spool cap 111 provides a first port a, through which pilot pressure is applied to change the stroke of the first spool 120. When pilot pressure is applied through the first port a, the stroke of the first spool 120 is changed by a degree corresponding to the level of pilot pressure. This consequently connects the first pump path and the first cylinder path, so that working fluid discharged by the hydraulic pump is supplied to the large pump 11 of the cylinder 10 along these paths, to be described in more detail later. The first spool 120 is elastically supported by a spring 121 disposed in the first spool cap 111. According to this configuration, the elastic restoring force of the spring 121 restores the first spool 120, moved by the pilot pressure, to the initial position when the pilot pressure is released. The first spool 120 has a first notch 120a in an outer circumferential surface thereof. When the first spool 120 is moved, i.e. when the first spool 120 is moved by a change in the stroke, the first spool 120 controls the connection between the first pump path and the first cylinder path using the first notch 120a aligned with the first pump path and the first cylinder path. Here, the areas of opening of the first pump path and the first cylinder path, i.e. the degrees of opening thereof, are determined depending on the degrees of alignment of the first pump path and the first cylinder path with the first notch 120a. The first spool 120 according to an exemplary embodiment controls the flow rate and pressure of working fluid supplied to the large chamber 11 of the cylinder 10 along the first pump path and the first cylinder path by controlling the areas of opening of the paths.

The second spool 130 is disposed within the valve block 110 to be reciprocally movable in the longitudinal direction. As illustrated in the drawings, the second spool 130 may be deposed diagonally allow the first spool 120. In addition, the second spool 130 connected to a second spool cap 112 coupled the valve block 110. The second spool cap 112 provides a second port b through which pilot pressure is applied to change the stroke of the second spool 130. When pilot pressure is applied through the second port b, the stroke of the second port 130 is changed by a degree corresponding to the level of pilot pressure. This consequently connects the second cylinder path and the first tank path, so that working fluid, contained in the small chamber 12, can return to the tank along the second cylinder path and the first tank path. In addition, the second spool 130 is elastically supported by a spring 131 disposed in the second spool cap 112, and has a second notch 130a provided in an outer circumferential surface thereof. When the second spool 130 is moved by a change in the stroke, the second spool 130 connects the second cylinder path and the first tank path via the second notch 130a aligned with the second cylinder path and the first tank path, and when the second cylinder path and the first tank path are connected, controls the areas of opening of the second cylinder path and the first tank path via the second notch 130a. Consequently, the second spool 130 controls the flow rate and pressure of working fluid returning to the tank along the second cylinder path and the first tank path from the small chamber 12 of the cylinder 10.

According to an exemplary embodiment, the flow rate and pressure of working fluid supplied from the large chamber 31 and the flow rate and pressure of working fluid returning from the smaller chamber 12 are independently or individually controlled by the first spool 120 and the second spool 130, respectively, to move the piston 15 of the cylinder 10 forwards (i.e. upwards in the drawings), to be described in more detail later.

The third spool 140 is disposed within the valve block 110 to be reciprocally movable in the longitudinal direction. As illustrated in the drawings, the third spool 140 may be disposed above the second spool 130 to face the second spool 130 in a top-bottom direction. In addition, the third spool 140 is connected to a third spool cap 113 coupled to the valve block 130. The third spool cap 113 provides a third port c through which pilot pressure is applied to change the stroke of the third spool 140. When pilot pressure is applied through the third port c, the stroke of the third spool 140 is changed by a degree corresponding to the level of pilot pressure. This consequently connects the second pump path and the third cylinder path, so that working fluid discharged by the hydraulic pump is supplied to the small chamber 12 of the cylinder 10 along the second pump path and the third cylinder path, to be described in more detail later. In addition, the third spool 140 is elastically supported by a spring 141 disposed in the third spool cap 113, and has a third notch 140a provided in an outer circumferential surface thereof. When the third spool 140 is moved by a change in the stroke, the third spool 140 connects the second pump path and the third cylinder path, and when the second pump path and the third cylinder path are connected, controls the areas of opening of the second pump path and the third cylinder path. Consequently, the third spool 140 controls the flow rate and pressure of working fluid supplied to the small chamber 12 of the cylinder 10 along the second pump path and the third cylinder path.

The fourth spool 150 is disposed within the valve block 110 to be reciprocally movable in the longitudinal direction. As illustrated in the drawings, the fourth spool 150 may be disposed below the first spool 120 to face the first spool 120 in a top-bottom direction. In addition, the fourth spool 150 is connected to a fourth spool cap 114 coupled to the valve block 110. The fourth spool cap 114 provides a fourth port d through which pilot pressure is applied to change the stroke of the fourth spool 150. When pilot pressure is applied through the fourth port d, the stroke of the fourth spool 150 is changed by a degree corresponding to the level of pilot pressure. This consequently connects the fourth cylinder path and the second tank path, so that working fluid contained in the huge chamber 11 of the cylinder 10 can return to the tank along the fourth cylinder path and the second tank path. In addition, the fourth spool 150 is elastically supported by a spring 151 disposed in the fourth spool cap 114, and has a fourth notch 150a provided in an outer circumferential surface thereof. When the fourth spool 150 is moved by a change in the stroke, the fourth spool 150 connects the fourth cylinder path and the second tank path via the fourth notch 150a aligned with the fourth cylinder path and the second tank path, and when the fourth cylinder path and the second tank path, are connected, controls the areas of opening of the fourth cylinder path and the second tank path via the fourth notch 150a. Consequently, the fourth spool 150 controls the flow rate and pressure of working fluid returning to the tank along the fourth cylinder path and the second tank path from the large chamber 11 of the cylinder 10.

According to an exemplary embodiment the flow rate and pressure of working fluid supplied to the small chamber 12 and the flow rate and pressure of working fluid returning from fee large chamber 11 are independently or individually controlled by the third spool 140 and the fourth spool 150, respectively, to move the piston 15 of the cylinder 10 backwards (i.e. downwards in the drawings), to be described in more detail later.

As described above, the spool valve 100 according to an exemplary embodiment includes the first spool 120, the second spool 130, the third spool 140, and the fourth spool 140, which are provided independently of each other. The spool valve 100 having this configuration can apply different levels of pressure to the spools, thereby individually controlling the flow rates and pressures of working fluid of the spools. The spool valve 100 according to an exemplary embodiment may include a drain core 115 provided between the first spool 120 and the fourth spool 150 and between the second spool 130 and the third spool 140, i.e. between the spools facing in a top-bottom direction, respectively, to remove the backpressure between the spools.

FIG. 2 is a cross-sectional view illustrating a spool valve according to another exemplary embodiment. As illustrated in FIG. 2, the spool valve 200 according to another exemplary embodiment includes a valve block 110, a first spool 150, and a second spool 130.

Another exemplary embodiment is substantially the same as the foregoing exemplary embodiment, except that the two spools are provided instead of the four spools and thus the drain core is removed. Accordingly, the same components will be denoted by the same reference numerals and detailed descriptions thereof will be omitted.

The spool valve 200 according to another exemplary embodiment includes the two spools 150 and 130. When it is intended to move the piston 15 of the cylinder 10 forwards, i.e. when pilot pressure is applied through the first port a and the second port b, the first spool 150 controls the flow rate and pressure of working fluid supplied to the large chamber 11 of the cylinder 10, while the second spool 130 controls the flow rate and pressure of working fluid returning to the tank from the small chamber 12 of the cylinder 10. When it is intended to move the piston 15 of the cylinder 10 backwards, i.e. when pilot pressure is applied through the third port e and the fourth port d, the first spool 150 controls the flow rate pressure of working fluid returning to the tank from the large chamber 11 of the cylinder 10, while the second spool 130 controls the flow rate pressure of working fluid supplied to the small chamber 12 of the cylinder 10. As described above, the first spool 150 according to another exemplary embodiment performs both the function of the second spool (120 in FIG. 1) and the function of the fourth spool (150 in FIG. 1) according to the foregoing exemplary embodiment, while the second spool 130 according to another exemplary embodiment performs both the function of the second spool (130 in FIG. 1) and the function of the third spool (140 in FIG. 1) according to the foregoing exemplary embodiment.

The spool valve 200 according to another exemplary embodiment can apply different levels of pilot pressure to move the first spool 150 and the second spool 130, depending on the operations and loads of the cylinder 10, thereby independently controlling the flow rate and pressure of working fluid supplied to the cylinder 10 and the flow rate and pressure of working fluid returning from the cylinder 10, like the spool valve (100 in FIG. 1) according to the foregoing exemplary embodiment.

Hereinafter, the operation of the spool valve according to exemplary embodiments will be described with reference to FIG. 1.

When pilot pressure is applied through the first port a of the first spool cap 111 to move the piston 15 of the cylinder 10 forwards, the first spool 120 is moved by a change in the stroke corresponding to the level of pilot pressure applied thereto. This consequently aligns the first notch 120a with the first pump path and the first cylinder path, thereby connecting the first pump path and the first cylinder path. Then, working fluid coming from the hydraulic pump through the pump core 118 pushes up the poppet 162 to feed into the large chamber of the cylinder 10 along the first pump path and the first cylinder path connected via the first notch 120a, through the first actuator port 116, and along the first cylinder line 13. When working fluid is supplied to the large chamber 11 of the cylinder 10, as described above, the piston 15 of the cylinder 10 moves forwards. In addition, when the second cylinder path and the first tank path are connected via the second notch 130a of the second spool 130 in response to pilot pressure being applied through the second port b, working fluid contained in the small chamber 12 of the cylinder 10 returns to the tank along the second cylinder path, the first tank path, the second cylinder path and the first tank path connected via the second notch 130a, and the tank core 119. Here, a level of pilot pressure different from a level of pilot pressure applied through the first port a can be applied through the second port b, so that the first spool 150 and the second spool 130 can be efficiently controlled, depending on the operating conditions of the cylinder 10. This can consequently improve fuel efficiency and increase the operating speed of the cylinder 10, i.e., an actuator.

In contrast, when pilot pressure is applied through the third port e of the third spool cap 113 to move the piston 15 of the cylinder 10 backwards, the third spool 140 is moved by a change in the stroke corresponding to the level of pilot pressure applied thereto. This consequently aligns the third notch 140a with the second pomp path and the third cylinder path, thereby connecting the second pump path and the third cylinder path. Then, working fluid coming from the hydraulic pump through the pump core 118 pushes up the poppet 162 to feed into the smaller chamber 12 of the cylinder 10 along the second pump path and the third cylinder path connected via the third notch 140a, through the second actuator port 116, and along the second cylinder line 14. When working fluid is supplied to the small chamber 12 of the cylinder 10, as described above, the piston 15 of the cylinder 10 moves backwards. When the fourth cylinder path and the second tank path are connected via the fourth notch 150a of the fourth spool 150 in response pilot pressure being applied through the fourth, port d of the fourth spool cap 114, working fluid contained in the large chamber 11 of the cylinder 10 returns to the tank along the cylinder line 13, the first actuator port 116, the fourth cylinder path and the second tank path connected to the fourth notch 150a, and the tank core 119. Here, a level of pilot pressure different from a level of pilot pressure applied through the third port c can be applied through the fourth port d, so that the third spool 140 and the fourth spool 150 can be independently or individually controlled, depending on the operating conditions of the cylinder 10. This can consequently improve the efficiency of the spool valve 100.

The foregoing descriptions of specific exemplary embodiments of the present disclosure have been presented with respect 10 the drawings and are not intended to be exhaustive or to limit the present disclosure to the precise forms disclosed, and obviously many modifications and variations are possible for a person having ordinary skill in the art in light of the above teachings.

It is intended therefore that the scope of the present disclosure not be limned to the foregoing embodiments, but be defined by the Claims appended hereto and their equivalents.

The invention claimed is:

1. A spool valve comprising:
   a valve block;
   a first spool disposed on one side within the valve block to be reciprocally movable in a longitudinal direction, and having a first notch provided in an outer circumferential surface thereof to be aligned with a first pump path and a first cylinder path provided within the valve block, wherein the first spool controls a connection between the first pump path and the first cylinder path using the first notch when moving in response to a change in a stroke thereof;
   a second spool disposed in the other side within the valve block to be reciprocally movable in a longitudinal direction, and having a second notch provided in an outer circumferential surface thereof to be aligned with a second cylinder path and a first tank path provided within the valve block, wherein the second spool controls a connection between the second cylinder path and the first tank path using the second notch when moving in response a change in a stroke thereof;

a third spool disposed within the valve block to face the second spool in a top-bottom direction and to be reciprocally movable in a longitudinal direction, and having a third notch provided in an outer circumferential surface thereof to be aligned with a second pump path and a third cylinder path provided within the valve block, wherein the third spool controls a connection between the second pump path and the third cylinder path using the third notch when moving in response to a change in a stroke thereof;

a fourth spool disposed within the valve block to face the first spool in a top-bottom direction and to be reciprocally movable in a longitudinal direction, and having a fourth notch provided in an outer circumferential surface thereof to be aligned with a fourth cylinder path and a second tank path provided within the valve block, wherein the fourth spool controls a connection between the fourth cylinder path and the second tank path using the fourth notch when moving in response to a change in a stroke thereof;

a first spool cap coupled to the valve block, connected to the first spool, and providing a first port through which a pilot pressure is applied to change the stroke of the first spool;

a second spool cap coupled to the valve block, connected to the second spool, and providing a second port through which a pilot pressure is applied to change the stroke of the second spool;

a third spool cap coupled to the valve block, connected to the third spool, and providing a third port through which a pilot pressure is applied to change the stroke of the third spool; and a fourth spool cap coupled to the valve block, connected to the fourth spool, and providing a fourth port through which a pilot pressure is applied to change the stroke of the fourth spool.

2. The spool valve according to claim 1, further comprising a drain core provided between the first spool and the fourth spool and between the second spool and the third spool.

3. The spool valve according to claim 2, further comprising a plurality of springs disposed within the first to fourth spool caps, respectively, to elastically support the first to fourth spools connected to the first to fourth spool caps.

4. The spool valve according to claim 1, further comprising:
a first actuator port provided in the valve block to connect the first cylinder path to a first cylinder line connected to a large chamber of the cylinder; and
a second actuator port provided in the valve block to connect the second cylinder path to a second cylinder line connected to a small chamber of the cylinder.

5. The spool valve according to claim 4, further comprising a port relief valve disposed in the valve block to be connected to the first actuator port and the second actuator port.

6. The spool valve according to claim 1, wherein the valve block comprises:
a pump core connecting the hydraulic pump to the first pump path to supply working fluid, discharged by the hydraulic pump, to the first pump path; and
a tank core connecting and the first tank path to a tank to recover working fluid, returning from the cylinder along the first tank path, to the tank.

7. The spool valve according to claim 6, wherein the valve block further comprises a load check valve disposed between the first pump path and the pump core.

8. A spool valve comprising:
a valve block;
a first spool disposed on one side within the valve block to be reciprocally movable in a longitudinal direction, and having a first notch provided in an outer circumferential surface thereof to be aligned with a first pump path and a first cylinder path provided within the valve block, wherein the first spool controls a connection between the first pump path and the first cylinder path using the first notch when moving in response to a change in a stroke thereof;
a second spool disposed in the other side within the valve block to be reciprocally movable in a longitudinal direction, and having a second notch provided in an outer circumferential surface thereof to be aligned with a second cylinder path and a first tank path provided within the valve block, wherein the second spool controls a connection between the second cylinder path and the first tank path using the second notch when moving in response a change in a stroke thereof; and
a third spool disposed within the valve block to face the second spool in a top-bottom direction and to be reciprocally movable in a longitudinal direction, and having a third notch provided in an outer circumferential surface thereof to be aligned with a second pump path and a third cylinder path provided within the valve block, wherein the third spool controls a connection between the second pump path and the third cylinder path using the third notch when moving in response to a change in a stroke thereof.

* * * * *